J. McCARTHY.
UNIVERSAL CLAMP FOR COLD SAWING MACHINES.
APPLICATION FILED MAY 24, 1907.
914,299.
Patented Mar. 2, 1909.
2 SHEETS—SHEET 1.
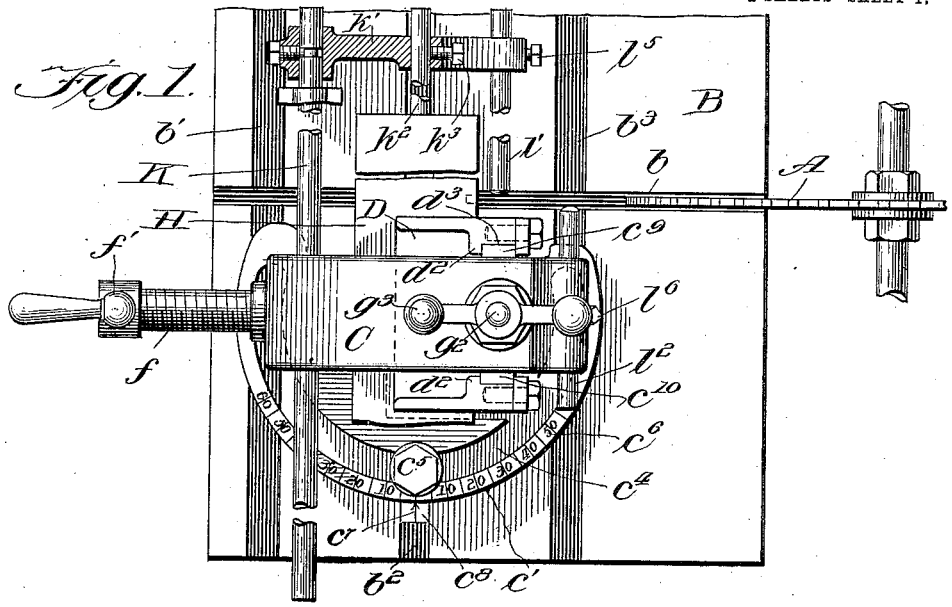
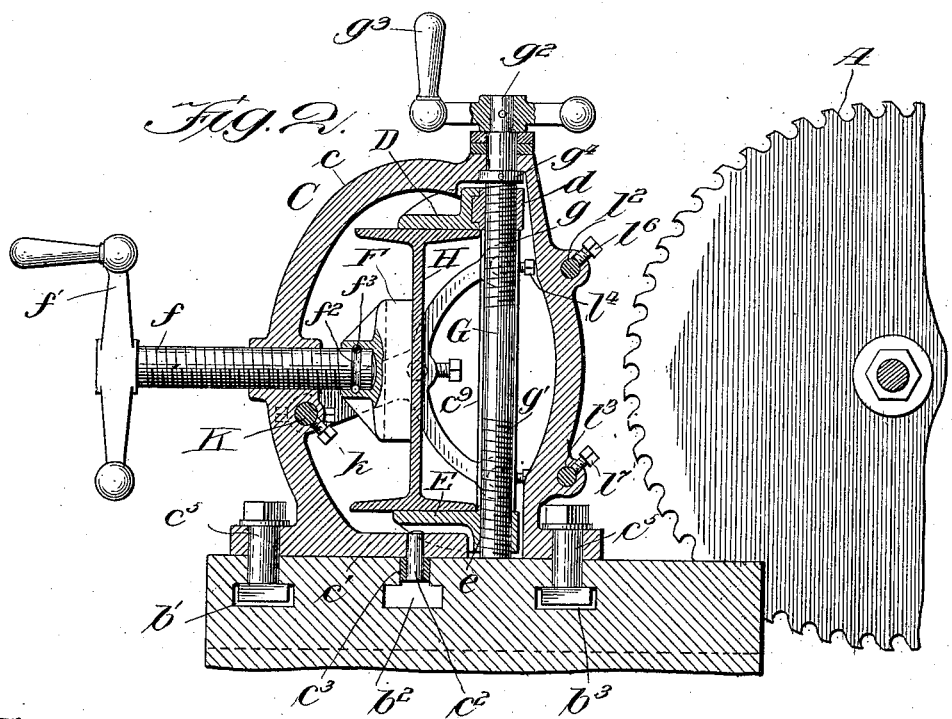
Witnesses:
Harry S. Gaither
Ruby V. Nash
Inventor:
James McCarthy
by Walter H. Chamberlain
his Attorney

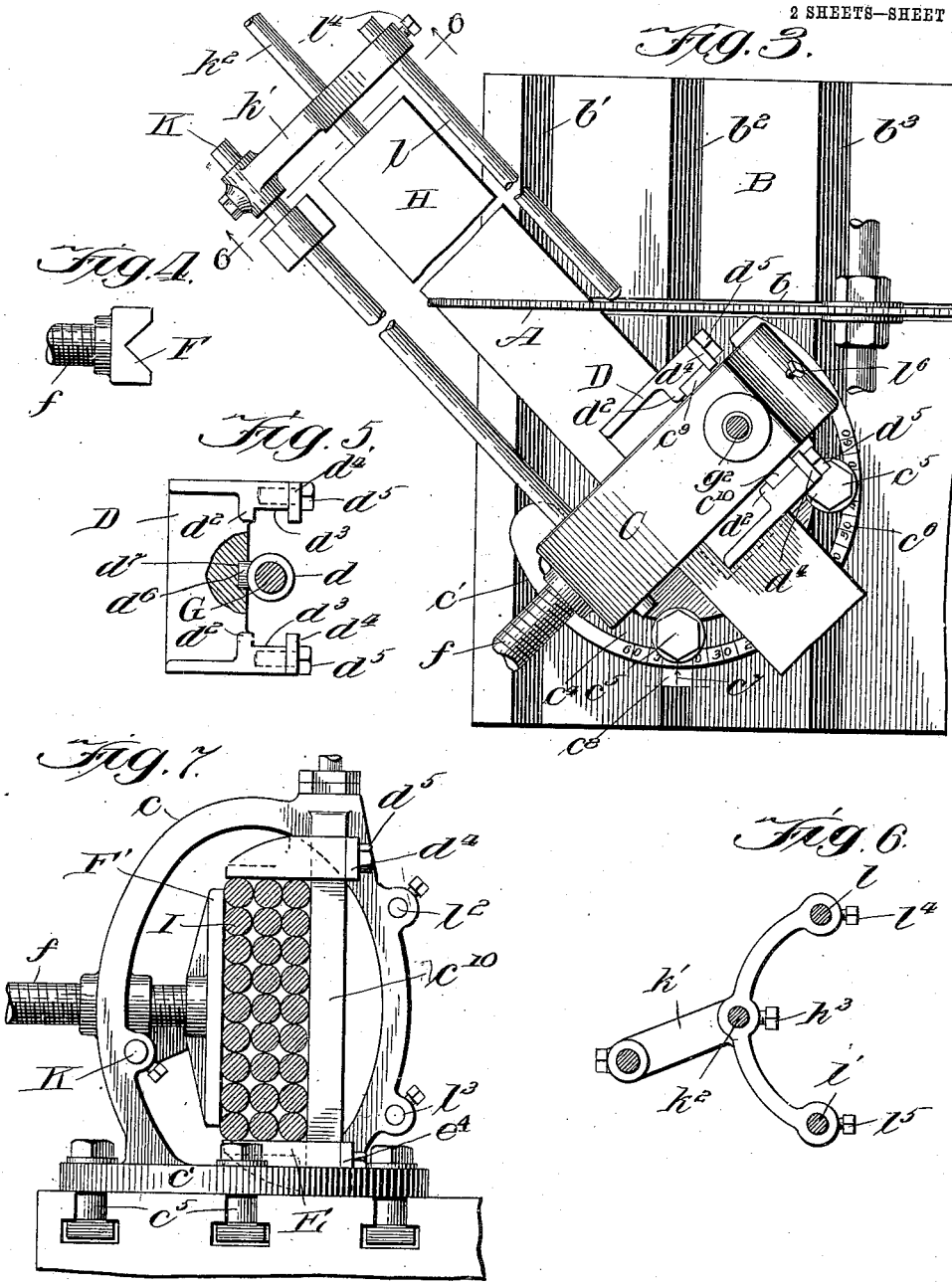

UNITED STATES PATENT OFFICE.

JAMES McCARTHY, OF PLAINFIELD, NEW JERSEY, ASSIGNOR TO QUINCY, MANCHESTER, SARGENT COMPANY, OF NEW YORK, N. Y., AND CHICAGO, ILLINOIS, A CORPORATION OF NEW JERSEY.

UNIVERSAL CLAMP FOR COLD-SAWING MACHINES.

No. 914,299.     Specification of Letters Patent.     Patented March 2, 1909.

Application filed May 24, 1907. Serial No. 375,409.

*To all whom it may concern:*

Be it known that I, JAMES McCARTHY, a citizen of the United States, residing at Plainfield, county of Union, State of New Jersey, have invented a certain new and useful Improvement in Universal Clamps for Cold-Sawing Machines, and declare the following to be a full, clear, and exact description of the same, such as will enable others skilled in the art to which it pertains to make and use the same, reference being had to the accompanying drawings, which form a part of this specification.

My invention relates to metal working machinery, and more particularly to means for supporting the work in a cold sawing machine or the like.

In cold saws, as usually constructed, there is a bed upon which the work is adapted to rest and a traveling rotary saw which passes across the bed. It is evident that the best results are obtained when the work is supported with its center in the plane of movement of the axis of the saw. However, the bed plate is a stationary member and therefore the position of the center of the work with respect to the axis of the saw depends upon the size of the work if the work is supported directly upon the saw bed. Heretofore it has been common practice in machines of this character to block up the work so as to raise it sufficiently above the bed to bring its center about in the plane of travel of the axis of the saw. This operation, of course, requires time, and considerable pains must be taken in order to position the work properly. Furthermore where the work is supported on blocks it is very difficult to hold it securely in place and there is always grave danger that the work will be shifted so as to cause the saw to catch and produce serious damage.

The object of my invention is to provide a simple and compact arrangement whereby the work in a machine of the character described may be quickly and conveniently clamped in any desired position without danger of loosening during the sawing operation.

A further object of my invention is to provide a clamp for cold sawing machines, wherein irregular objects, or a number of separate pieces may be securely clamped in any desired relation to the saw.

A further object of my invention is to provide a clamping device which can be used in standard machines without necessitating any reconstruction of the machines.

A further object of my invention is to provide a clamping device for holding work in metal working machines which shall be simple in construction, comparatively inexpensive in manufacture, and efficient in operation.

The various features of novelty which characterize my invention will be hereinafter particularly pointed out in the claims, but for a full understanding of my invention, and of its various objects and advantages, reference may be had to the following detailed description of the accompanying drawing, wherein:

Figure 1 is a plan view of a portion of a cold saw having applied thereto my improved clamping device; Fig. 2 is a section taken at right angles to Fig. 1 directly through the clamping device; Fig. 3 is a view similar to Fig. 1 showing the clamp adjusted so as to cause the work to be sawed diagonally; Figs. 4 and 5 are details showing clamping jaws; Fig. 6 is a section taken on line 6—6 of Fig. 3 looking in the direction of the arrows; and Fig. 7 is a side elevation of the clamp having arranged therein a number of bars which it is desired to clamp rigidly in place.

Reference being had to the drawings, A represents a saw which may be supported and driven in any suitable manner so as to move across a work-supporting bed B. The bed is illustrated as having a slot $b$ into which the saw is adapted to project in order that it may cut entirely through the bottom of a piece of work supported directly on the table. A number of T-slots $b'$ to $b^3$ are arranged in the upper surface of the table and at right angles to the direction of movement of the saw. All these parts may take any usual or preferred forms, since the particular forms illustrated are simply indicative of general types.

In order that a piece of work may always be supported in the most suitable position relative to the saw, irrespective of the shape or size of the work, and in order that any desired number of small pieces which it is desired to saw may be conveniently and securely held in position, I have provided an adjustable clamp C which is adapted to be securely fastened to the bed of the machine.

Generally speaking, the clamp consists of a frame member, having a number of adjustable coöperating jaws within which the work is received, the frame being adapted to be locked to the bed of the machine in various angular positions so as to present the work at any desired angle. In the arrangement shown, the frame of the clamp consists of an arch-shaped member $c$ supported upon a base $c'$. At about the center of the base is a downwardly projecting pin $c^2$ which is adapted to be inserted in one of the slots in the bed and from a pivot about which the clamp may be rotated. If desired, a bushing $c^3$ may be placed between the pin and the walls of the slot. The base is provided with a segmental slot $c^4$ through which one or more bolts $c^5$ may be passed into one or more of the slots in the bed of the machine. It will be seen that by tightening the bolt or bolts $c^5$ the clamp may be secured in any desired angular position with respect to the saw. The length of the segmental slot is, of course, made such as to permit any desired angular adjustment to be obtained. Furthermore in order that the clamp may be accurately and conveniently adjusted to any desired angle, a series of graduations $c^6$ are arranged about the edge of the base plate, and a zero mark $c^7$ coöperating with the graduations on the base plate is arranged on the bed of the machine. The zero mark may conveniently be formed on a block $c^8$ which may be placed in position on any machine by slipping it in one of the T-slots in the bed thereof. Three movable clamping jaws are preferably provided, two of these, D and E, being arranged to be moved vertically, and the third, F, being adapted to be moved horizontally.

On the frame, there may be a fixed abutment of some kind, so that when the movable jaws are forced against the sides of the piece of work, the work is securely clamped between the jaws and the stationary abutment. The jaws D and E may conveniently be controlled by means of a screw-threaded shaft G the threads $g$ at one end being right-handed, and the threads $g'$ at the other end left-handed. The threads $g'$ may mesh directly with internal threads in an opening $e$ in the clamp E. The threads $g$, preferably mesh with internal threads in a nut $d$ which is detachably secured to the clamping jaw D. By providing a separate nut in connection with this clamping jaw the construction is simplified and the assembling of the parts facilitated. The upper end $g^2$ of the rod G projects through, and is journaled within, the upper wall of the frame, and carries a handle $g^3$ whereby it may be rotated. The handle $g^3$ and a collar $g^4$, by engaging with opposite sides of the top wall of the frame, hold the shaft against axial movement. It will be seen that, by turning the handle, the jaws D and E are simultaneously moved from or toward each other according to the direction of rotation of the handle.

In order to prevent the jaws D and E from rotating with the shaft, any suitable form of guiding device may be employed: thus there may be vertical guides $c^9$ and $c^{10}$ arranged on opposite sides of the member $c$, and either secured to this member or formed integral therewith, as may be desired. The jaws D and E are provided with faces which slide upon the guides so that, although the jaws are free to be moved up and down, they are held against rotation through their engagement with the guides. In order that the guides may serve to hold the jaws in accurate alinement instead of simply preventing them from being rotated, the jaws are preferably provided with pockets which partially surround the guides. These pockets may conveniently be formed as shown in Fig. 5, that is, shoulders $d^2$ may be arranged at the inner ends of the guiding surfaces $d^3$ and corresponding shoulders may be formed at the outer edges of the surfaces $d^3$ by means of detachable plates $d^4$ which are secured to the jaw in any suitable manner, as for example, by means of bolts $d^5$. This arrangement enables the jaw to be slid into place laterally, and to be then secured by fastening on the plates $d^4$. The connection between the nut $d$ and the jaw D is also preferably such that when the plates $d^4$ are removed, the jaw may be disengaged by lateral movement, not only from the guides, but also from the nut. The connection between the nut and the jaw is therefore preferably in the form of a pin $d^6$ which enters a recess $d^7$ in the jaw. The jaw E may have its guide-ways formed in the same manner, that is by means of detachable plates $e^4$ corresponding to the plates $d^4$. The jaw E may be supported and operated in any suitable manner, as for example, by means of a screw-threaded shaft $f$ which passes through the frame $c$ and carries the jaw F at its inner end and a handle $f'$ at its outer end. The connection between the jaw and the shaft is such a one that the shaft may rotate within the jaw, but is incapable of axial movement with respect thereto. This is conveniently accomplished by forming an annular groove $f^2$ near the inner end of the shaft, and securing a pin $f^3$ in the jaw in a position to be engaged in a groove. By turning the handle $f'$ the jaw is moved in or out as the case may be.

Instead of providing as a separate element, an abutment to coöperate with the movable jaws, I prefer to place the guides $c^9$ and $c^{10}$ in such position that when the work is clamped in place it is held between the guides and the several jaws.

In using the clamp for holding a piece of work, such as an eye beam H, the beam is passed through the clamp so as to rest upon the lower jaw. The handle $g^3$ is then rotated until the top of the eye beam comes into engagement with the upper jaw, the beam is now centered with respect to the saw. Upon turning the handle $f'$ the beam is forced inwardly until it engages with the guides or abutments $c^9$ and $c^{10}$. Both of the handles may now be turned so as to give the final set to the jaws, whereby the beam is rigidly held in position. If it is desired to cut the beam at right angles, the clamp is adjusted so that the zeros on the clamp and on the bed of the machine register. If the cut is to be made at any other angle, the work is properly positioned to effect this by turning the clamp until the proper graduation registers with the zero on the bed plate.

When it is desired to saw a number of small pieces, as for example, bars I, the jaw F is removed and an elongated jaw F' substituted therefor. This jaw should be of such a length that when the clamping process is complete the work is practically surrounded by the jaws. In this way every piece of the work is engaged by a portion of the clamping devices and there is no danger that any piece will work loose.

If desired, a gage for enabling the operator to cut a series of pieces to equal lengths, without being required to measure each piece, may be provided. This gage may conveniently consist of a rod K which is slidably supported in the frame $c$ and held in any adjusted position by means of a set-screw $k$. A bracket $k'$ projects at right angles from one end of the member K and a rod $k^2$ is adjustably supported by the bracket parallel with the rod K. Rough adjustments are secured by adjusting the member K, and then the bar or rod $k^2$ is adjusted, and this bar is locked in its adjusted position by means of a set-screw $k^3$. Each piece of work is passed through the clamp until its end engages with the end of the rod $k^2$ and the clamp is then set up with the assurance that the member will be cut the proper length.

In starting a cut, the saw is apt to vibrate, and to obviate this I prefer to make use of saw guides which may conveniently take the form of rods $l$ and $l'$ adjustably secured in the bracket $k'$ and other rods 12 and 13 adjustably secured in the member $c$. The rods 1 to 13 are adjusted so that they just touch the saw on opposite sides and steady it. Suitable set screws 14 to 17 may be provided for locking the saw guides in place.

It will now be seen that I have provided an arrangement whereby work of any desired character, and consisting of any desired number of pieces may be conveniently and effectively clamped in the most advantageous position with respect to a saw without endangering the safety of the saw or the safety of the operator. Furthermore I have provided a device which may be applied to existing machines without requiring any alteration to be made in such machines.

While I have described in detail a preferred form of my invention, I do not desire to be limited to the exact form shown since in its broader aspects my invention covers also other forms as will be evident from the definitions of my invention comprised in the appended claims.

Having now fully described my invention, what I claim as new and desire to secure by Letters Patent is:

1. In a clamp, a base plate, a frame in the shape of a closed arch rising above said base plate, a fixed work-engaging abutment, a pair of clamping jaws arranged within said frame and movable from and toward each other parallel with said abutment and in a plane at right angles to said base plate and to said abutment, a third movable jaw within said frame and movable in said plane and at right angles to said abutment, and means for moving said jaws.

2. In a clamp, a base-plate, a frame in the shape of a closed arch rising above said base-plate, a fixed abutment having a work-engaging face extending at right angles to said base-plate, a pair of clamping jaws arranged within said frame and movable from and toward each other parallel with said abutment and in a plane at right angles to the base plate and the working face of said abutment, a third clamping jaw arranged within said frame and movable from and toward the abutment in the direction parallel with the base-plate and in said plane, and means for moving said jaws.

3. In a clamp, a base plate, a frame in the shape of a closed arch rising above and integral with the base-plate, a pair of abutments lying on opposite sides of said frame and connected at their ends with the base plate and the frame respectively, a pair of clamping jaws arranged within said frame and slidably mounted upon said abutments, a third clamping jaw arranged within said frame and movable from and toward said abutments, and means for moving said jaws.

4. In a clamp, a base plate, a frame in the shape of a closed arch rising above and integral with said base-plate, a pair of abutments arranged on opposite sides of said frame and integrally connected at their opposite ends with the frame and the base-plate, a pair of jaws arranged within the frame and slidably mounted upon said abutments, a screw-threaded shaft arranged between and parallel with said abutments and having right and left handed threads coöperating with said jaws, means on the exterior of said frame for turning said shaft, a third jaw arranged within the frame and movable at right angles to said abutments and means for moving said latter jaw.

5. In a cold saw, a bed, a saw arranged to travel across said bed, a base-plate pivotally supported upon said bed for rotation about an angle at right angles to said bed, a frame in the shape of a closed arch rising above said base-plate, a work-engaging abutment extending at right angles to said base-plate, a pair of jaws arranged within said frame and slidably mounted on said abutment, means for simultaneously moving said jaws from or toward each other, a third jaw arranged within said frame and moving at right angles to said abutment, and means for moving said latter jaw.

6. In a cold saw, a bed, a saw arranged to travel across the bed, a base-plate pivotally supported upon said bed for rotation about an axis at right angles to said bed, a frame in the shape of a closed arch rising above said base-plate, clamping jaws arranged within said frame for supporting a piece of work at any distance above the bed, a rod adjustably secured to said frame and extending at right angles to the plane thereof, an arm extending at right angles from said rod, a work gage adjustably mounted on said arm, and a saw guide also adjustably supported upon said arm.

7. In a clamp, a base plate, means for supporting said base plate for rotation about an axis at right angles thereto, a graduated scale on said base plate arranged in the form of an arc having its center upon said axis, a stationary index coöperating with said scale, means for locking said base plate in any angular position, an open-ended frame projecting vertically from said base plate and having a vertical work-engaging face, a pair of clamping jaws supported within said frame for movements from and toward each other parallel with said working face and a third clamping jaw arranged within said frame for movements from and toward said working face, and means for moving said jaws.

In testimony whereof, I sign this specification in the presence of two witnesses.

JAMES McCARTHY.

Witnesses:
G. W. V. MOY,
F. R. PHILLIPS.